(12) United States Patent
Zimmerli

(10) Patent No.: US 10,501,287 B2
(45) Date of Patent: Dec. 10, 2019

(54) DAMPER UNIT FOR AN ELEVATOR

(71) Applicant: Inventio AG, Hergiswil (CH)

(72) Inventor: Philipp Zimmerli, Harkingen (CH)

(73) Assignee: INVENTIO AG, Hergiswil NW (CH)

( * ) Notice: Subject to any disclaimer, the term of this patent is extended or adjusted under 35 U.S.C. 154(b) by 358 days.

(21) Appl. No.: 15/536,795

(22) PCT Filed: Dec. 14, 2015

(86) PCT No.: PCT/EP2015/079651
§ 371 (c)(1),
(2) Date: Jun. 16, 2017

(87) PCT Pub. No.: WO2016/096763
PCT Pub. Date: Jun. 23, 2016

(65) Prior Publication Data
US 2017/0355563 A1 Dec. 14, 2017

(30) Foreign Application Priority Data
Dec. 17, 2014 (EP) .................................... 14198490

(51) Int. Cl.
B66B 7/00 (2006.01)
B66B 7/04 (2006.01)
B66B 17/34 (2006.01)
B66B 7/08 (2006.01)
F16F 15/14 (2006.01)
F16F 15/18 (2006.01)

(52) U.S. Cl.
CPC .............. *B66B 7/042* (2013.01); *B66B 7/044* (2013.01); *B66B 7/08* (2013.01); *B66B 17/34* (2013.01); *F16F 15/1421* (2013.01); *F16F 15/18* (2013.01)

(58) Field of Classification Search
CPC ............ B66B 7/042; B66B 7/044; B66B 7/08

USPC ......................................................... 187/292
See application file for complete search history.

(56) References Cited

U.S. PATENT DOCUMENTS

| 3,942,607 | A | | 3/1976 | Sobat | |
|---|---|---|---|---|---|
| 5,117,946 | A | * | 6/1992 | Traktovenko | B66B 7/046 187/410 |
| 5,165,142 | A | * | 11/1992 | Pilsbury | B66B 13/301 16/90 |
| 5,476,159 | A | * | 12/1995 | Cho | B66B 11/0407 187/289 |
| 5,833,216 | A | * | 11/1998 | Husmann | F16F 15/121 254/266 |
| 5,896,949 | A | * | 4/1999 | Hamdy | B66B 7/027 187/292 |

(Continued)

FOREIGN PATENT DOCUMENTS

| CA | 2495329 A1 | 8/2005 |
|---|---|---|
| CA | 2540755 A1 | 9/2006 |

(Continued)

*Primary Examiner* — David S Warren
(74) *Attorney, Agent, or Firm* — William J. Clemens; Shumaker, Loop & Kendrick, LLP

(57) ABSTRACT

A damper unit for an elevator, for the purpose of reducing vertical vibration of a stopping elevator car, has at least one roller that, in an active position, is in contact with a guide rail for the elevator car and can be rotated about an axis of rotation. For damping rotary movements during vertical vibration of the stopping elevator car, the roller is connected to a rotation damper.

13 Claims, 2 Drawing Sheets

(56) References Cited

U.S. PATENT DOCUMENTS

| | | | | |
|---|---|---|---|---|
| 5,984,053 | A * | 11/1999 | Lee | B66B 7/046 182/141 |
| 6,032,764 | A * | 3/2000 | Ferrisi | B66B 7/046 187/410 |
| 6,877,587 | B2 * | 4/2005 | Kunz | B66B 1/3492 187/394 |
| 6,945,364 | B1 * | 9/2005 | Wesson | B66B 13/30 16/96 R |
| 7,143,871 | B2 * | 12/2006 | Wesson | B66B 13/30 187/334 |
| 7,543,686 | B2 * | 6/2009 | Kulak | B66B 7/044 187/292 |
| 8,761,947 | B2 * | 6/2014 | Wang | F16F 9/535 187/228 |
| 9,371,210 | B2 * | 6/2016 | Parillo | B66B 5/0018 |
| 9,382,098 | B2 * | 7/2016 | Arai | B66B 7/046 |
| 9,731,937 | B2 * | 8/2017 | Steiner | B66B 7/046 |
| 9,828,211 | B2 * | 11/2017 | Schonauer | B66B 5/02 |
| 2004/0216962 | A1 * | 11/2004 | Kunz | B66B 1/3492 187/394 |
| 2006/0207835 | A1 * | 9/2006 | Kulak | B66B 7/044 187/292 |
| 2007/0000732 | A1 * | 1/2007 | Kulak | B66B 7/044 187/346 |
| 2011/0132697 | A1 | 6/2011 | Utsunomiya | |
| 2013/0192932 | A1 * | 8/2013 | Parillo | B66B 5/0018 187/289 |
| 2013/0299283 | A1 | 11/2013 | Wang et al. | |
| 2013/0304262 | A1 * | 11/2013 | Wang | B66B 7/042 700/280 |
| 2014/0158473 | A1 * | 6/2014 | Arai | B66B 7/046 187/406 |
| 2014/0251734 | A1 * | 9/2014 | Wang | B66B 7/043 187/247 |
| 2015/0291392 | A1 * | 10/2015 | Steiner | B66B 7/046 187/410 |
| 2017/0233221 | A1 * | 8/2017 | Geisshusler | B66B 5/0031 187/247 |
| 2017/0327345 | A1 * | 11/2017 | Steinhauer | B66B 11/0407 |
| 2017/0334678 | A1 * | 11/2017 | Sonnenmoser | B66B 1/3438 |
| 2017/0349408 | A1 * | 12/2017 | Villa | B66B 7/042 |
| 2017/0355553 | A1 * | 12/2017 | Steinhauer | B66B 5/0031 |
| 2017/0355563 | A1 * | 12/2017 | Zimmerli | B66B 17/34 |
| 2018/0093863 | A1 * | 4/2018 | Hawkins | B66B 7/023 |
| 2018/0334363 | A1 * | 11/2018 | Saarela | B66B 13/02 |
| 2019/0210838 | A1 * | 7/2019 | Studer | B66B 5/0031 |

FOREIGN PATENT DOCUMENTS

| | | |
|---|---|---|
| EP | 0129678 A1 | 1/1985 |
| EP | 1424302 A1 | 6/2004 |
| EP | 2607287 A1 | 6/2013 |
| FI | 944867 A | 4/1995 |
| GB | 800628 | 8/1958 |
| JP | 2003018577 A | 1/2003 |
| JP | 2010285241 A | 12/2010 |
| JP | 2011157219 A | 8/2011 |
| WO | 9509801 | 4/1995 |
| WO | 2003008319 A1 | 1/2003 |
| WO | 2003037773 A1 | 5/2003 |
| WO | 2006137113 A1 | 12/2006 |
| WO | 2007029331 A1 | 3/2007 |
| WO | 2011021064 A1 | 2/2011 |
| WO | 2011146073 A1 | 11/2011 |
| WO | 2012128758 A1 | 9/2012 |

* cited by examiner

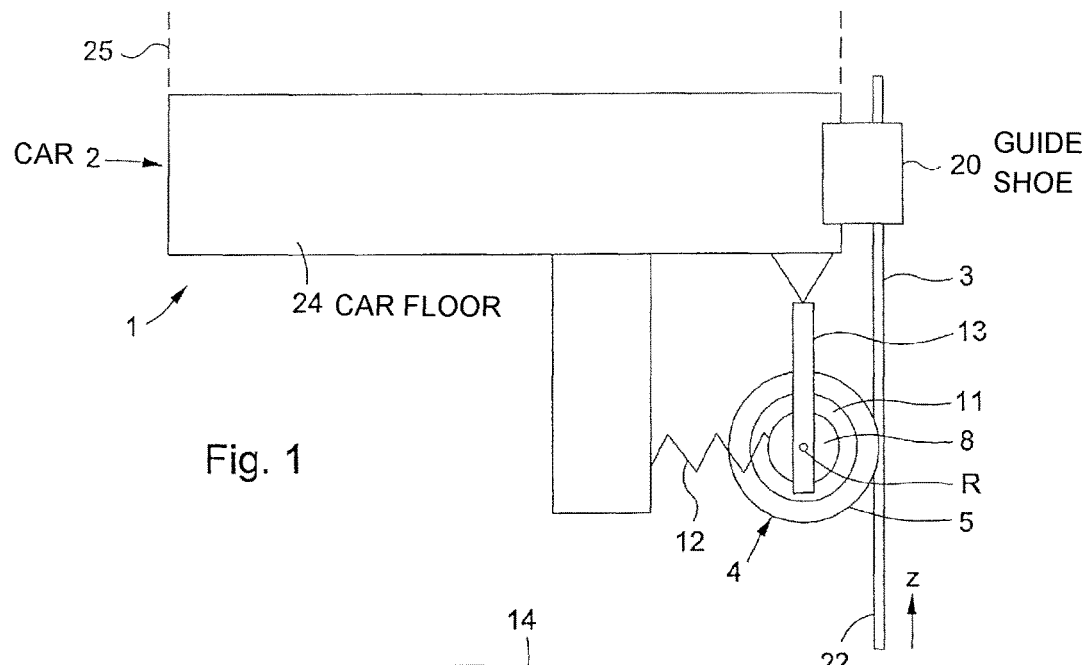
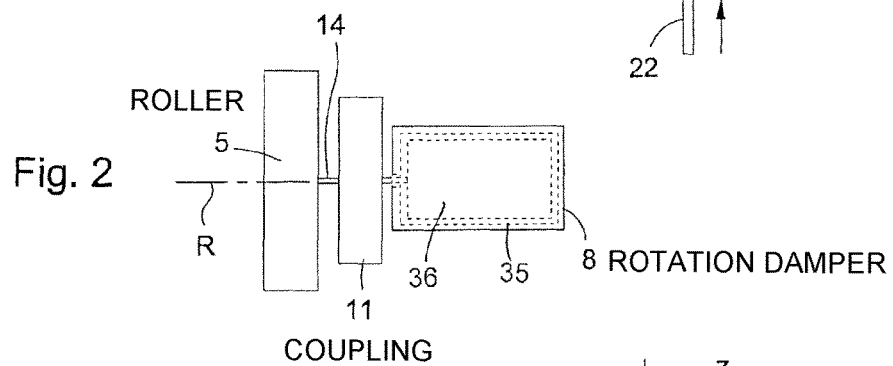
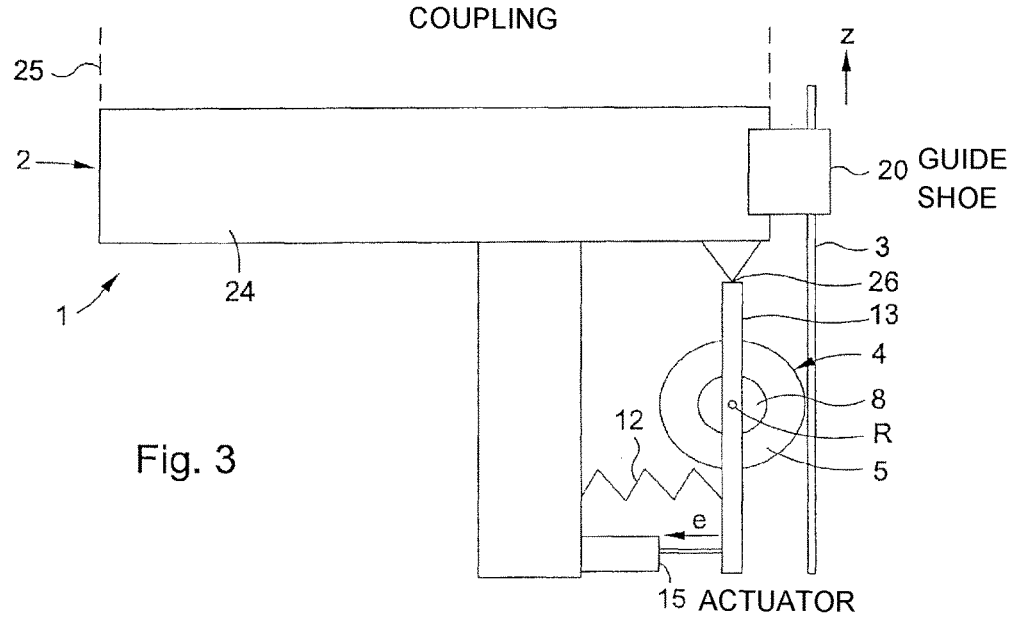

DAMPER UNIT FOR AN ELEVATOR

FIELD

The invention concerns a damper unit for an elevator for reducing the vertical vibration of a stopping elevator car.

BACKGROUND

Because of the elasticity of the support means, people or goods entering or leaving the elevator car cause unwanted vertical vibrations of the elevator car. Such vertical vibrations occur particularly in elevators based on support belts as the support means, which have recently enjoyed increased popularity. Since, compared to steel cables, belts exhibit more unfavorable vibration behavior, the vertical vibrations increasingly impair passenger comfort and operational safety. Furthermore, the problem intensifies as the elevator gains in height. To reduce such vertical vibrations it is known to use separate damper units, which—compared, for example, with safety brakes or other safety related braking devices—apply a small braking force to the guide rails.

A generically comparable damper unit was made known, for example, by EP 1 424 302 A1. This patent shows an elevator car with a damper unit that has a brake element, wherein the brake element is pressed against a lateral guide surface of the guide rail when the elevator car is stationary. In order to activate the damper unit the latter is mechanically coupled with a door opening unit of the elevator car. In the active position the brake element effects a sliding contact with the guide rail.

SUMMARY

An aim of the present invention is therefore to avoid the known disadvantages and, in particular, to create a damper unit for an elevator, with which vibrations, in particular vertical vibrations of the elevator car in its stationary phases, can be easily and efficiently reduced. Further, the damper unit should protect the guide rail.

These aims are achieved, according to the invention, by a damper unit for an elevator for the reduction of vibrations, in particular vertical vibrations, of a stopping elevator car. The damper unit comprises at least one roller, which at least in an active position, is in contact with a guide rail for guiding the elevator car, and which is rotatable around a rotation axis when the vibrations, in particular the vertical vibrations, of the elevator car are active. Since the damper unit has a rotation damper, which is connected or connectable to the at least one abovementioned roller, for damping the rotary movements of the roller during vibrations, in particular vertical vibrations, of the stopping elevator car, good damping results are easily and efficiently achieved when the elevator car is stationary. The rotation damper comprises preferably a damper part rotatable about a rotation axis, wherein the rotation axis of that damper part and the rotation axis of the roller are arranged or aligned coaxially. This damper unit, which comprises a rotation damper connected or connectable to the roller with a damper part that can be rotated about the rotation axis defined by the roller, has the further advantage that the damper unit is available as a compact constructional unit.

As machine components in general and in other fields of application rotation dampers are already known and in common use. A rotation damper is understood to be a damper for damping mechanical vibrations which arise from rotary movements around a rotation axis. A rotation damper is characterized in that its damping effect is related to the rotation axis. It is therefore necessary to differentiate between rotation dampers and shock absorbers which are otherwise frequently used for damping, the damping effect of which occurs in a translational or axial direction. Such a linear shock absorber, which, for example, has a cylinder with a moving piston inside it, effects a damping of the stroke motion of the cylinder. Rotation dampers, by contrast, have braking means, which are designed so that the braking means during a rotation of the damper part create a braking torque which works on the damper part in at least one direction of rotation.

The rotation damper may have a fixed damper housing in which the aforementioned damper part is rotatably installed. A fluid may be used as a braking means in order to damp the rotary movements of the damper part. Between the damper housing and the rotatable damper part a gap or working space is formed, in which a viscose fluid is contained. Instead of many others, DE 296 04 260 U1 is referred to, by which such rotation dampers were made known. Such rotation dampers are also known as hydraulic rotation dampers. Blade elements may be attached to the damper part, whereby a so-called 'blade rotation damper' is created.

The roller may be permanently in contact with the guide rail. As a result, the roller is not only in contact with the guide rail in the active position, but also in a passive or non-activated position while the elevator car is moving. In this case it may be advantageous if the roller is mounted in a freely rotatable manner in the non-activated position. In particular for this configuration, it is advantageous if the rotation damper controls the active position of the roller via a controllable electric coupling, or the roller can be connected to the rotation damper by the controllable electric coupling. This type of damper unit could therefore also be used as a roller-guiding shoe for guiding the elevator car. The controllable electric coupling could however also be used for other variants of damper units, for example for damper units where the at least one roller is spaced apart from the guide rail in the rest position.

In a further embodiment, means of applying force may be provided with which the roller or rollers, at least in the active position and in some cases also in a non-activated position, may be pressed against the guide rail. These means of applying force ensure a reliable contact between roller and guide rail.

It may be especially advantageous, if the means of applying force comprise a spring element. The spring element may, for example, be a helical compression spring. The roller or rollers, depending on their operational purpose, may in the active position, be pushed against the guide rail by means of a spring element or by means of a plurality of spring elements.

The damper unit may comprise a lever arm which at one end is flexibly connected or connectable to the elevator car and which is preferably supported at an opposite end by the means of applying force. With an arrangement such as this the roller may be easily brought into the active position and/or the active position may be easily maintained.

The at least one roller may be mounted on an axle or fixed to a shaft. If the roller is mounted on an axle, the rotation damper may be arranged in a radial direction between the axle and the roller. If a shaft is used, the rotation damper may be arranged in an axial direction next to the roller.

Different models of passive or active rotation dampers may be used. The rotation damper may, for example, have a damper element made of an elastomer material. The rotation damper may have a predefined damping characteristic.

However, adjustable rotation dampers, the damping characteristic of which may be adjusted according to different requirements, may also be advantageous. Hydraulic rotation dampers also come into consideration. The rotation dampers could then also be formed as electrical rotation dampers. Such an electrical rotation damper basically corresponds to an electrical generator with a rotatable damper part, which forms the rotor, and a fixed damper part, which forms the stator.

For certain applications it may suffice to use a rotation damper which only works in one direction of rotation. However, a rotation damper which works in both directions of rotation, or a bi-directional rotation damper, is particularly advantageous.

The damper unit may comprise an actuator with which the at least one roller may be actively or passively moved between a rest position and an active position, wherein the at least one roller, in the rest position of a travelling elevator car, or during an elevator car movement, may be moved contact-free along a guide rail. In the rest position, the roller is spaced apart from the guide rail, whereby no rotary movement of the roller is possible and the guide rail remains unaffected.

If the guide rail has two opposing, preferably plane-parallel lateral guide surfaces and a face-side guide surface connecting the lateral guide surfaces, it can be advantageous if the damper unit has a roller associated with the face-side guide surface of the guide rail. It can be particularly advantageous if the damper unit only has the aforementioned roller. However, it might also be envisaged, for certain application purposes, that two further rollers be provided in addition to the aforementioned roller, which are each associated with the opposing lateral guide surfaces of the guide rail.

Alternatively or possibly additionally, the damper unit may have two opposing rollers, wherein the guide rail may be arranged between the rollers/may be received or receivable between the rollers. The rollers mentioned here are thus associated with the lateral guide surfaces of the guide rail.

The two facing rollers may particularly preferably be rotatably mounted in a damped manner by means of rotation dampers at opposing ends of a lever element. Thus, the lever element may be moved by a pivoting movement between a rest position, in which the rollers are each spaced apart from the guide rail, so that the rollers, in the rest position of the moving elevator car, can be moved contact-free along the guide rail, and an active position.

The lever element may be formed as a rocker, wherein the pivot axis for the pivoting movements of the lever element is arranged centrally between the rotation axes of the rollers. The pivot axis and the rotation axes of the rollers may in that context extend advantageously axially parallel.

The damper unit may have an actuator for the pivoting movement of the lever element. The two rollers may be brought from the rest position into the active position at the desired time by means of the actuator.

The actuator may comprise an electromagnet for controlling the active position of the rollers. The active position can be achieved particularly easily and quickly by activating the electromagnet.

The at least one roller may have a running surface or contact side to the guide rail, wherein the running surface, for example in relation to a steel guide rail, is formed from a material with a static friction coefficient greater than 0.5. A material may preferably be used to form the running surface, which ensures that the roller cannot skid along the guide rail when the elevator car stops and load changes occur.

The material may for example be a natural rubber-based coating. The roller may for example have a ring shaped running body or rim made of rubber material. The rubber coated running surface results in an effective damping of the vertical vibration as well as a low-noise operation. If the rollers remain in contact with the guide rail in the rest position, good running characteristics may also be achieved during elevator car journeys.

A further aspect of the invention relates to an elevator with at least one previously described damper unit. It can be advantageous if the elevator has two damper units per elevator car, wherein one damper unit may be associated with each guide rail for guiding the elevator car. Further, advantageous sliding guide shoes or roller guide shoes may be provided on the elevator car for guiding the elevator car.

DESCRIPTION OF THE DRAWINGS

Further individual characteristics and advantages of the invention are revealed in the description below of an embodiment and in the drawings.

FIG. 1 shows a simplified representation of an elevator with a lateral view of a damper unit according to the invention;

FIG. 2 shows a plan view of the damper unit according to FIG. 1;

FIG. 3 shows a further elevator with an alternative damper unit;

DETAILED DESCRIPTION

Figure 4:
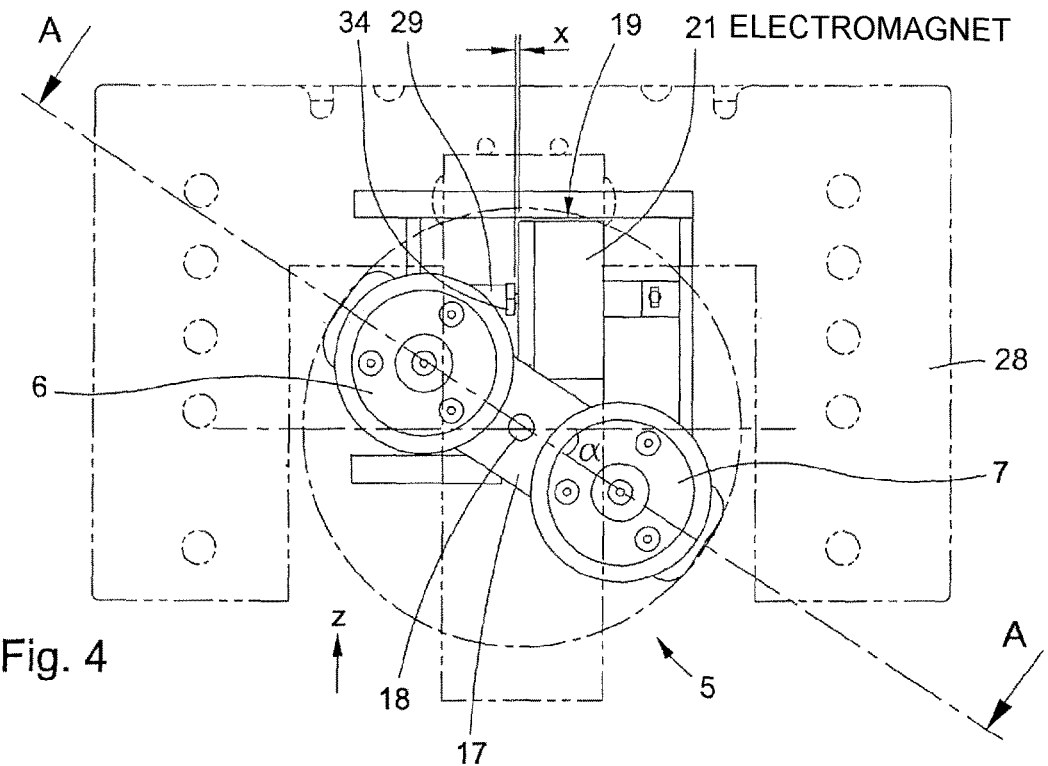
FIG. 4 shows a front view of a damper unit according to a further embodiment.

FIG. 1 shows an elevator labelled, as a whole, as 1, with an elevator car 2 which may be moved up and down for the transportation of people or goods. The elevator car 2 may be moved by means of a drive unit in a vertical elevator shaft by support means in the form of support cables or support belts (not shown here). The elevator car 2 has an elevator car floor 24, to which elevator car lateral walls 25, indicated by dashed lines, are attached. For guiding the elevator car the elevator system 1 has guide rails 3 extending in a vertical direction z. Sliding guide shoes 20 are arranged on the elevator car 2, which guide the moving elevator car 2 along the guide rails. In the present embodiment the guide shoe 20 is attached to the elevator car floor 24. In addition, the elevator car 2 may have a further guide shoe 20 arranged in the roof area. The guide shoe may be a sliding guide shoe. Alternatively however, it is also conceivable to use roller guide shoes as guide shoes 20.

As an elevator car stops, unwanted vibrations, in particular vertical vibrations of the elevator car 2 may arise. Vertical vibrations arise in particular when people enter or leave the elevator car. The load change causes the elevator car 2 to vibrate. This phenomenon is particularly pronounced in elevators based on support belts and elevators with high shaft heights. In order to reduce the vertical vibrations in stopping elevator cars the elevator 1 is fitted with one or a plurality of damper units with which the vertical vibrations of the stopping elevator car can be reduced. In FIG. 1, such a damper unit is labelled 4. In FIG. 1 (as well as FIG. 3) just one guide rail 3 is depicted for the purposes of simplicity and better understanding. However, as a rule the elevator 1 has two guide rails 3 facing each other, which are each fixed to opposite shaft walls. The damper unit 4, explained in detail below, is of the same kind or similar in form as the second guide rail (not shown).

The damper unit 4 has a roller 5, which is in contact with the guide rail 3. The roller 5 is connected with a rotation damper 8 via a coupling 11. The coupling 11 is designed as a controllable electric coupling and may be brought from an active position, in which the coupling is rigidly connected to the roller 5, into a non-activated position in which the roller 5 is decoupled from the rotation damper 8. Naturally, the reverse is also possible. The rotation damper 8 may thus be connected with the roller 5 via the controllable electric coupling in order to achieve the active position. During vertical vibrations of the stopping elevator car 2, the rotation damper 8 which preferably works in two directions, or the bi-directional rotation damper 8, ensures damping of the rotary movements of the roller 5 and therefore an effective reduction of the vertical vibrations. The roller 5 is pushed against the guide rail 3 by, for example, a helical compression spring or another spring element 12. In the present embodiment the roller 5 is in contact with an end face 22 of the guide rail 3. The damper unit 4 comprises a lever arm 13 pivotably attached to the elevator car floor 24, on which the roller 5 is rotatably mounted. As a result the roller 5 is not only in contact with the guide rail 3 in the active position, but also, for elevator car journeys, in the passive or non-activated position. In this case it can be advantageous if, in the passive or non-activated position, the roller is mounted so that it can rotate freely. Since the roller 5 is therefore in constant contact with the guide rail 3, the damper unit 4 could also be used as or in a configuration for guiding the elevator car 1. Such a guidance configuration could, apart from the damper unit 4 shown in FIG. 1 with the roller 5 touching the end face of the guide rail 3, could comprise two further guide rollers, wherein the two additional guide rollers are associated with the plane-parallel lateral guide surfaces of the guide rail. This guidance configuration could thus be a roller guide shoe. In the latter case, the guide shoe 20 depicted in FIG. 1 could then be omitted.

FIG. 2 shows a possible configuration of an assembly with a roller 5, rotation damper 8 and coupling 11. The three components of the abovementioned assembly have a common rotation axis R. The roller 5 is firmly fixed to a shaft 14 which is rotatable about the axis R. The three components 5, 11, 8 are, relative to the rotation axis R, arranged one beside the other. The coupling 11, is arranged between the roller 5 and the rotation damper 8. The rotation damper 8 can be connected to the roller 5 by means of the controllable electric coupling 11. Here the coupling 11 is controllable using a control device (not depicted). The control device sends, for example, a control signal to the coupling 11 as soon as the elevator car 2 stops, or when the elevator car door opens. Upon receipt of a control signal the coupling 11 is activated and the roller 5 is thus connected to the rotation damper 8. The damper unit is now in effective operation, the roller is in the active position. As a rule, the activation is maintained until the doors are closed again and therefore no more significant load changes are possible. In this active position, thanks to the damping by the rotation damper 8, vertical vibrations of the stopping elevator car 2 are effectively reduced. During activation the control device can, if necessary, send further control commands for the damper unit 4.

In FIG. 2 the basic configuration of the rotation damper is indicated schematically using dashed lines. The rotation damper 8 has a rotatable damper part 36, which is installed in a damper housing 35. The rotation damper 8 may be designed, for example, as a hydraulic rotation damper. In the gap between the damper housing 35 and the damper part 36 there is a viscous medium which has a braking effect on the damper part 36 when there is a rotary movement of the damper part 36 thus damping the rotary movement of the roller during vertical vibrations of the stopping elevator car. It is also readily apparent from FIG. 2 that the rotation axes of the roller 5 and the damper part 36 of the rotation damper 8 are arranged, or aligned, coaxially. In the embodiment according to FIG. 1, the roller 5 is in contact with the guide rail 3 not only when the elevator car is stationary but also during an elevator car journey. However, it can also be advantageous to separate the roller 5 from the guide rail 3, so that during elevator car journeys the roller 5 does not impact the guide rail 3. In that case it must be possible to move the roller 5 of the travelling elevator car 2 along the guide rail 3 contact-free in a rest position. The damper unit 4 according to the embodiment in FIG. 3 has such functionality. In FIG. 3, an actuator 15, for example a spindle drive or another linear drive, a pneumatic or hydraulic actuator, is responsible for the fact that the roller 5 can be brought from the active position shown in FIG. 3, in which the roller is in contact with the guide rail and damps the vertical vibrations by virtue of the rotation damper 8, into the aforementioned rest position. The direction of movement for moving the lever arm 13 from the active position into the rest position is indicated by an arrow e. In the rest position the lever arm 13 is retained by the actuator 15. If the elevator car stops and an opening of the door is determined or triggered, a control signal is sent to the actuator 15, whereupon the actuator 15 releases the lever arm 13. The lever arm thus released, is pivoted due to the spring force of the spring element 12, around the pivot axis 26 and thus pushed against the guide rail 3, resulting in the roller 5 being brought into the active position. The damper unit 4 in FIG. 3, described here, does not therefore need a coupling like that in the embodiment according to FIG. 1. For certain application purposes, for example where there is an increased need for control, it could be advantageous, to additionally use an electrically controllable coupling.

In both of the foregoing embodiments the rollers, which are connected or connectable to rotation dampers, impact the end faces 22 of the guide rail 3. However, the damper unit may also work on the lateral guide surfaces 23 bordering on the end face 22, which face one another and usually run plane-parallel. An embodiment of a damper unit 5 such as this is depicted in FIGS. 4 and 5, which also contain constructional details.

FIG. 4 shows a front view of a damper unit 5. The front view corresponds to a viewing direction along a surface normal of the end face (not shown here) of the guide rail (see the following FIG. 5, in which the said end face is labelled 22). The damper unit 5 has two rollers 6 and 7. The rollers 6, 7 are rotatably mounted on a lever element 17. The lever element in turn 17 is pivotable about a pivot axis 18 and is rotatably arranged on a console 28. The lever element 17 is tilted at an angle to the horizontal labelled $\alpha$. The guide rail which extends in the direction z may be arranged between the rollers. In FIG. 4 the damper unit 5 with the rollers 6, 7, is in an active position, in which the rollers 6, 7 are in contact with the guide rail 3. The lever element 17 can be pivoted between the rest position and the active position by means of an actuator 19. This actuator 19 comprises, for example, an electromagnet 21 designed as a traction magnet with a drawbar 29 axially connected to an armature of the electromagnet. The drawbar 29 is connected to the pivoting lever element 17 by a lever arm (not shown here). The drawbar 29 may be shifted back and forth to a limited extent and secured on the armature by means of a lock nut 34, whereby the distance labelled 'x' may be enlarged or reduced. Depending on the rail width of the guide rail the distance x and the length of the magnetic rod including the armature and drawbar, can be varied by adjusting the lock nut 34, the length of the magnetic rod comprising anchor and draw bar, and in this way the damper unit can be adapted to the guide rail. For example, for guide rails 3 with a rail width of 9 mm, a distance x may be selected or set which is between 1 mm and 3 mm. For wider guide rails it is advantageous to set a greater distance (e.g. rail width: 19 mm, distance x=10 to 15 mm). When the electromagnet 21 is deactivated, the drawbar 29 together with the armature of the electromagnet 21, depicted according to FIG. 4 and which is now no longer supplied with current, is shifted to the left. The angle of tilt α is reduced, the rollers 5, 7 move into a rest position in which the rollers 6, 7 are spaced apart from the guide rail.

Figure 5:
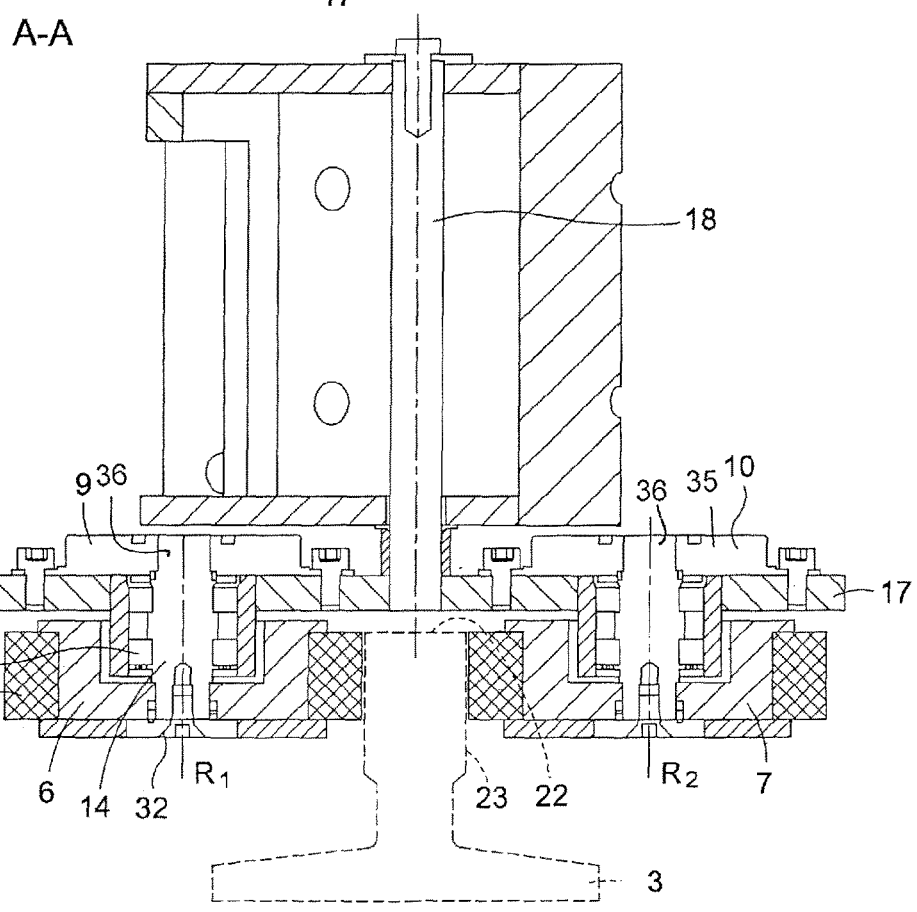
FIG. 5 shows a sectional representation of the damper unit in FIG. 4 (section plane A-A).

In FIG. 5 which shows the damper unit in FIG. 4 along the sectional plane A-A, the guide rail 3 is depicted by a dashed line. The guide rail 3 is formed as a T-profile comprising a rail foot and a bar projecting from the rail foot with the end face 22 and the two plane-parallel lateral guide surfaces 23 facing one another. The rollers 6, 7 are obviously associated with the lateral guide surfaces 23. The two facing rollers 6, 7 are rotatably mounted in a damped manner on opposite ends of the lever element 17 by means of rotation dampers 9, 10. The lever element 17 may thus be moved by a pivoting action in order to set the rest position of the rollers 6, 7 and the active position of the rollers. The lever element 17 is in the form of a rocker, the pivot axis for the pivoting action is arranged centrally between the rotation axes R1, R2, of the rollers 6, 7. The rollers 6, 7 are connected to the shaft 14 via a screw connection by means of screws 32. The shaft 14 for its part, is rotatably connected to the lever element 17 via a rolling bearing 31, in present case, by way of example, a cylindrical roller bearing. The rolling bearings depicted here may alternatively be replaced by sliding bearings. In relation to the rollers 6, 7, the rotation dampers are arranged on the opposite side of the lever element 17. The rotation dampers 9, 10 are screwed onto the lever element 17 and comprise a stub shaft labelled 36 of the respective shaft 14. This stub shaft forms the damper part 36 of the rotation damper 9, 10, which is rotatably mounted in the fixed damper housing 35 and on which, for damping purposes, braking means are applied, whereby a braking force is created which works in the direction of rotation. The rotation damper 9, 10 may be a purely mechanical rotation damper, in which the damper part 36 has a friction surface and inside the damper housing 35 a corresponding friction surface is provided which engages with the friction surface of the damper part 36. However, a braking means could also be a viscous medium which would fill the gap between the damper housing 35 and the damper part 36. Alternatively, the rotation dampers 9, 10 could be realized as electrical rotation dampers. In that case the rotatable damper part 36 would form the rotor of an electrical generator.

The rollers 6, 7 have a ring-shaped running body 33 made of rubber material. The rubberized running surface/the side contacting the guide rail ensures good running characteristics as well as low-noise operation. By deactivating the electromagnet 21, the rollers 6, 7 can be brought from the active position into the rest position, wherein the reverse movement from the active position into the rest position in the present embodiment may be produced by merely utilizing gravitational force. This reverse guide movement may also be produced in addition or alternatively by the use of spring elements and other resetting means.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A damper unit for an elevator for reducing a vertical vibration of a stopping elevator car, comprising:
    at least one roller mounted on the elevator car, the at least one roller, in an active position, being in contact with a guide rail for guiding the elevator car and is rotatable about an axis of rotation; and
    a rotation damper connected or connectable to the at least one roller for damping rotary movements of the at least one roller during the vertical vibration of the stopping elevator car.

2. The damper unit according to claim 1 wherein the rotation damper controls the active position of the roller via a controllable electric coupling.

3. The damper unit according to claim 1 including a means of applying force for pressing the at least one roller, when in the active position, against the guide rail.

4. The damper unit according to claim 3 wherein the means of applying force is a spring element.

5. The damper unit according to claim 3 including a lever arm being, at one end, flexibly connected or connectable to the elevator car and supported by the means of applying force.

6. The damper unit according to claim 1 including an actuator for moving the at least one roller between a rest position and the active position, wherein the at least one roller in the rest position can be moved by the elevator car contact-free along the guide rail.

7. The damper unit according to claim 1 wherein the at least one roller, in the active position, contacts a guide surface on an end face of the guide rail.

8. The damper unit according to claim 1 wherein the at least one roller is a first roller and including a second roller, the first and second rollers facing each other, wherein the guide rail is arranged between the first and second rollers.

9. The damper unit according to claim 8 wherein the first and second rollers are rotatably mounted and damped by rotary dampers on opposite ends of a lever element, wherein the lever element pivots the first and second rollers between a rest position and the active position, and wherein in the rest position the first and second rollers are each spaced apart from the guide rail and can be moved by the elevator car contact-free along the guide rail.

10. The damper unit according to claim 9 wherein the lever element is formed as a rocker, wherein a pivot axis for pivoting movement of the lever element is arranged centrally between rotary axes of the first and second rollers.

11. The damper unit according to claim 9 including an actuator for controlling the pivoting movement of the lever element.

12. The damper unit according to claim 11 wherein the actuator includes an electromagnet for controlling the active position of the first and second rollers.

13. An elevator having an elevator car and at least one of the damper unit according to claim 1 associated with the elevator car.

* * * * *